Oct. 6, 1931.  H. J. MURPHY  1,825,973
LUBRICATING SYSTEM
Filed Oct. 9, 1926  2 Sheets-Sheet 2
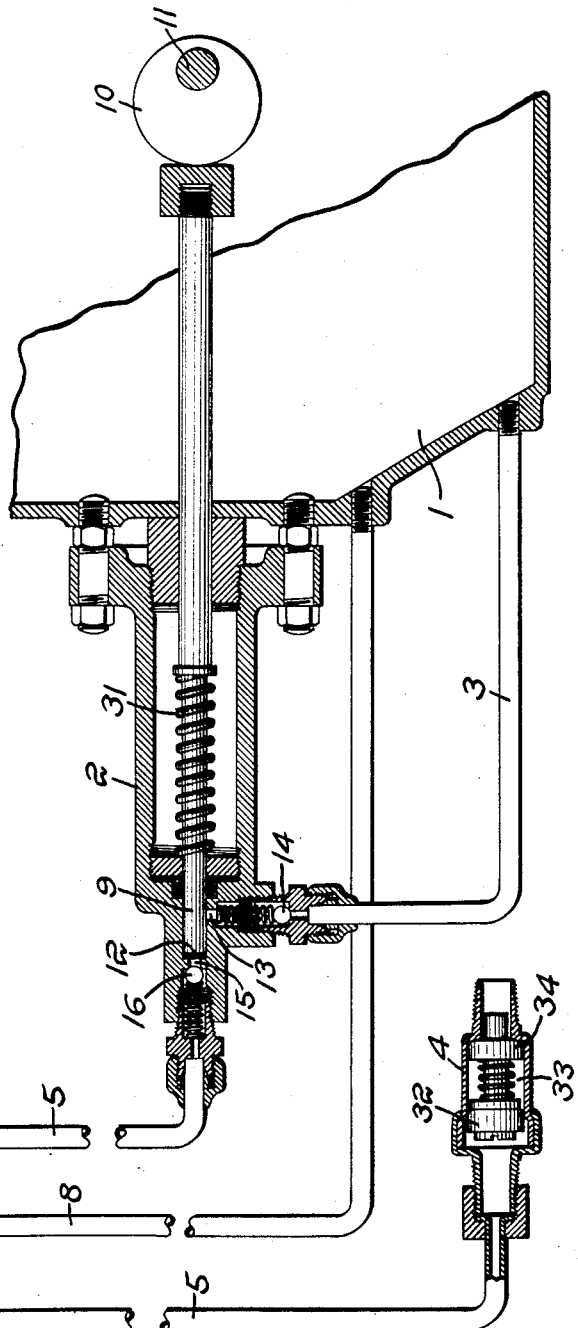
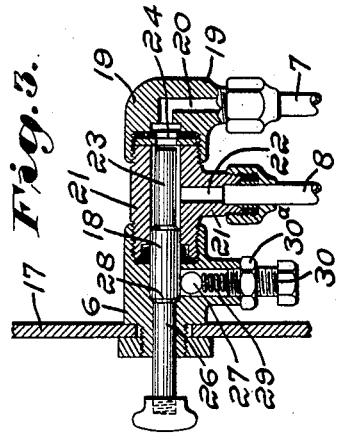
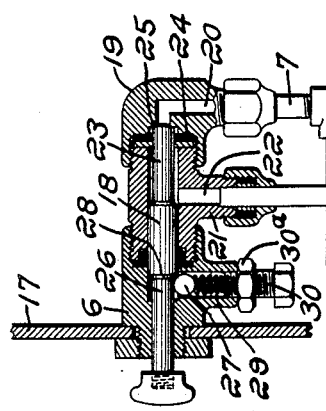
Inventor:
Howard J. Murphy,
by Emery, Booth, Janney & Varney
Attys.

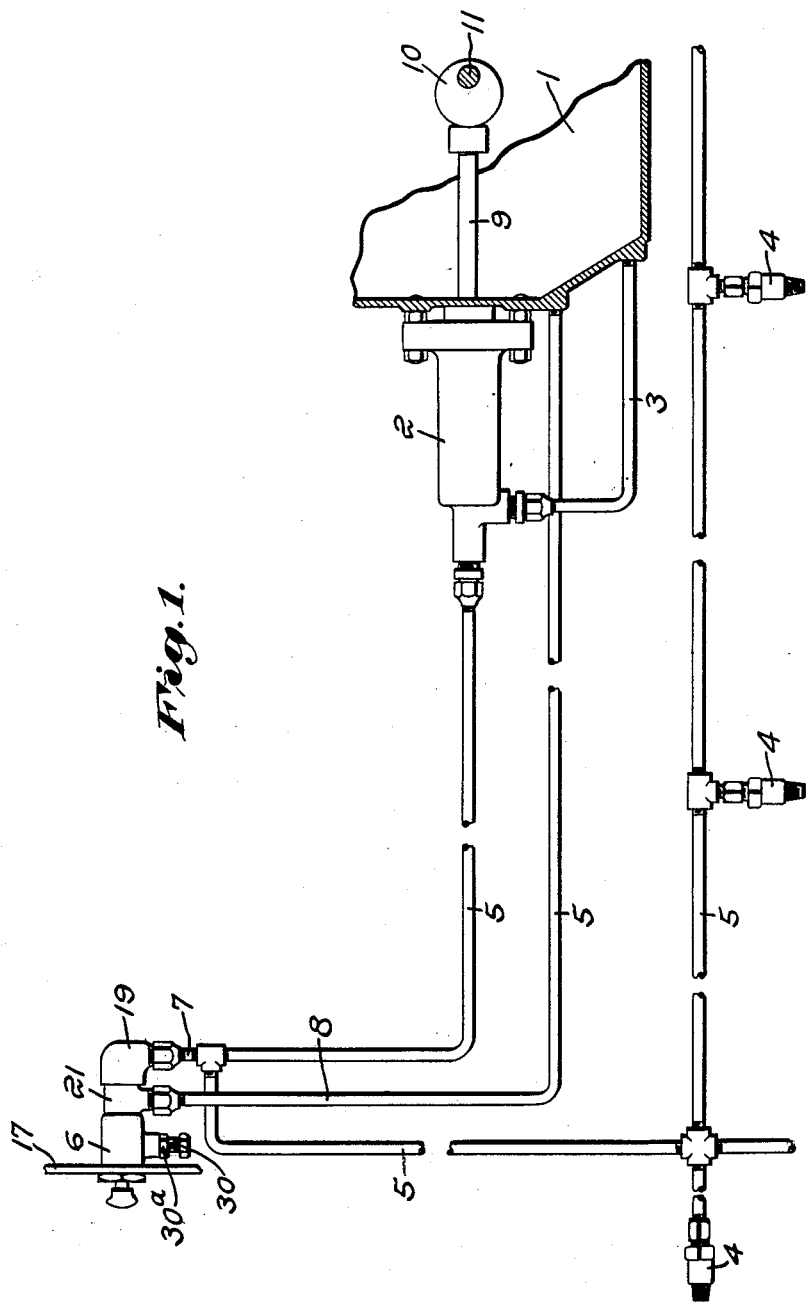

Patented Oct. 6, 1931

1,825,973

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING SYSTEM

Application filed October 9, 1926. Serial No. 140,516.

This invention aims to provide improvements in central lubricating systems for motor vehicles, machines and the like.

In the drawings, which illustrate a preferred embodiment of my invention:—

Figure 1 is a general layout of the system showing a portion of the crankcase, of a motor vehicle engine, in cross-section;

Fig. 2 is an enlarged view of the layout showing the crankcase, pump, by-pass device and a lubricant cup partly in cross-section; and Fig. 3 is a section through the by-pass device showing the other position from that shown in Fig. 2.

Referring to the embodiment of my invention illustrated in the drawings, I have shown a central lubricating system which includes a reservoir 1, a pump 2, connected through the conduit 3 with the reservoir, a plurality of cups 4, connected with the pump through a pipe system 5, and a by-pass device, or lubricant control device 6. The lubricant control device 6 is connected to the pipe system 5 by a conduit 7, and with the reservoir 1 by a pipe 8 as shown in Figs. 1 and 2.

The reservoir in this instance is the crankcase of the motor vehicle and the pump is bolted directly to the side of the crankcase, so that the pump piston 9 may be operated by a cam 10. The cam is preferably secured to the cam shaft 11 of the motor. The piston 9 reciprocates in a chamber 12 of relatively small cross-sectional area. This chamber is connected, near one end, by an inlet port 13 with the conduit 3. A ball check valve 14 is interposed between the port 13 and conduit 3 to prevent return of lubricant to the conduit 3, after once passing into the chamber 12. The outlet end of the chamber 12 is connected with the pipe system 5 by a port 15, and a second ball check valve 16 is interposed between the pipe system 5 and port 15 to prevent return of lubricant from the pipe system to the chamber 12.

The lubricant cups 4 may be of any suitable construction, but I have selected for illustrative purposes charge-determining cups substantially the same as shown and more fully described in my co-pending application Serial No. 80,244, filed January 9th, 1926.

The by-pass device 6, as shown in Figs. 2 and 3, is a combined hand operative and automatically operative mechanism, which, when it is desirable to force lubricant from the cups 4 to the parts to be lubricated, is operated by hand and thereafter automatically operated by the pressure of the lubricant in the system 5 to by-pass the lubricant from the pump back to the reservoir 1.

The by-pass device may be located at the dash 17 of the motor vehicle, or at any other place convenient to the hand of the operator of the vehicle. This device is composed of several pieces secured together to form the body, and the pieces are bored to receive the slidable member 18, having a button at one end. One of the pieces 19 of the body has an inlet passage 20 communicating with the conduit 7. Another of the pieces 21 is provided with an outlet passage 22, communicating with the pipe 8. The bore in the piece 21 provides a chamber for the lubricant to pass from the inlet to the outlet and the end of the slidable member is reduced at 23, to permit free passage of lubricant around the member 18 when it is in the position shown in Fig. 3.

A flexible washer 24 is secured between the pieces 19 and 21 and intersects the chamber through which the lubricant passes. This washer is adapted to surround the reduced end 23 of the member 18, when moved forward to the position shown in Fig. 2, thereby to provide a lubricant tight seal and prevent passage of lubricant when in this position. The end of the slidable member may seat against a shoulder 25, thereby providing a valvelike construction to assist in preventing by-passing the lubricant until desired.

In order to hold the slidable member 18 in the position shown in Fig. 2, until a predetermined pressure is brought to bear at the end of the slidable member, I have provided a simple spring-pressed ball detent arrangement which may be adjusted to vary the pressure required to move the slidable member. This detent arrangement includes a reduced portion 26 to provide a detent for a ball 27 and a shoulder 28 which may bear against the ball 27. A spring 29 normally presses against the ball at one end, while the other end is seated against an adjusting screw 30 having a lock nut 30a to lock it in a given position. By compressing or releasing the spring 29, by means of the adjusting screw, the pressure on the member 18, which will be required to displace the ball 27 and move the slidable member, will be varied.

Assuming that the engine of the motor vehicle is in operation, the system will operate normally as follows. The cam 10 will reciprocate the piston 9 of the pump, because the spring 31 keeps the piston rod against the cam at all times. As the piston 9 reciprocates, lubricant is drawn by suction from the reservoir 1 and forced through the pipe system 5. Normally the lubricant may by-pass through the lubricant control device (Fig. 3) back into the reservoir 1. However, at the same time lubricant will flow past the pistons 32 in the cups 4 so that the chamber 33 in each cup may be filled. The valvular means 34, as more fully shown and described in the above-mentioned application, prevents free passage of lubricant through the cups, however, and it is therefore trapped in the chambers 33.

While the engine is running, the bearings of the vehicle or other machine may be lubricated by simply pressing upon the button attached to the slidable member 18. Thus the slidable member is moved into the position shown in Fig. 2, to close the inlet passage 20 and prevent the lubricant from by-passing from the system 5 back to the reservoir. Now as the pump 2 continues to force lubricant to the system 5, the pressure will be raised gradually and the piston 32 in each cup 4 will be moved to first close the passage into the chamber 33, then, after the chamber is closed, to open the valvular means and force the lubricant from the chamber to the part to be lubricated (not shown).

The detent means which holds the slidable part 18 in forward position, as shown in Fig. 2, is preferably set so that the pressure required to be exerted upon the reduced end 23 of the slidable part is greater than required to operate all of the pistons 32 in the cups 4. Thus, after the means in the cups have been operated to expel a predetermined quantity of lubricant, the pressure will continue to increase in the pipe system 5 until sufficient automatically to displace the ball 27 against the pressure of the spring 29 and move the slidable member 18 back to its normal position, as shown in Fig. 3. The lubricant in the system may then by-pass through the lubricant control device 6 to reduce the pressure in the system and permit the springs 35 in the cups to return the pistons 32 to their normal positions.

The system illustrated by the drawings and described above is simple in construction and operation and is particularly desirable because it requires a minimum of attention, it being only necessary for the operator to push the button to move the slidable member when desirable to lubricate the bearings of the vehicle or machine. The remainder of the operation is automatic and positive in operation.

While I have shown and described one embodiment of my invention, it should be understood that I have done so for purposes of clarification rather than limitation, my invention being best defined by the following claims.

Claims:

1. A central lubricating system comprising, in combination, a lubricant measuring cup for supplying a predetermined quantity of lubricant to a part to be lubricated, a source of lubricant supply, pump means for forcing lubricant from said source of supply to said lubricant cup, a conduit from said pump to said cup and a single control device manually operable to admit flow of lubricant from said pump to said cup and automatically operable by the pressure of the lubricant acting upon said device to prevent building up of the pressure of lubricant at said cup subsequent to said cup supplying a predetermined quantity of lubricant to the part to be lubricated.

2. A central lubricating system comprising, in combination, a lubricant measuring cup, charge-determining means associated with said cup and operable by lubricant pressure for forcing a predetermined quantity of lubricant from said cup to a part to be lubricated, a source of lubricant supply, pump means for forcing the lubricant from said supply to the cup, a lubricant flow control unit and a system of conduits connecting the parts of the system in such a manner that lubricant may flow from the pump through the control unit back to the source of supply at the same time flowing under sufficient pressure to fill the cup without operating said charge-determining means, said control unit operable to prevent further flow of lubricant from the pump to the source of supply, thereby causing the lubricant pressure to rise to such a point that the charge-determining means will be operated thereby to force the lubricant from said cup to the part to be lubricated, the pressure of the lubricant thereafter operating upon the flow control unit to permit flow of lubricant from the system to the source of supply, thereby reducing the pressure in the system and permitting the charge-determining means to return to its normal position.

3. A central lubricating system comprising, in combination, a source of lubricant supply, a pump, a lubricant cup through which lubricant may be supplied to a part to be lubricated, a lubricant control device and a pipe system connecting the various parts of said system, said control device comprising an inlet passage connected by said system to said pump, an outlet connected by said system to the source of supply, a sliding part adapted to be moved toward the inlet passage to close said passage and prevent direct passage of lubricant through said control device and cooperating detent means for holding said sliding part in its passage-closing position until the pressure of the lubricant on the end of said sliding part becomes sufficient to disengage said detent means and move said sliding part into passage-opening position.

4. In a central lubricating system having a plurality of charge-determining cups, and a pump for forcing lubricant from a source of supply through a pipe system to said cups, a combined hand operative and automatic lubricant pressure operative device inserted in the pipe system, said device including means providing a chamber having inlet and outlet passages, the inlet connected to the pipe system and the outlet connected to a conduit leading back to the source of supply, a sliding element adapted to be moved by hand to close said inlet, thereby to force lubricant in the pipe system to operate said cups, a spring pressed ball cooperating with a shoulder on said sliding part to hold said part in inlet closing position until the pressure on the end of said part is sufficient to overcome the spring pressure against said ball.

5. In a central lubricating system having a plurality of charge-determining cups, and a pump for forcing lubricant from a source of supply through a pipe system to said cups, a combined hand operative and automatic lubricant pressure operative device inserted in the pipe system, said device including means providing a chamber having inlet and outlet passages, the inlet connected to the pipe system and the outlet connected to a conduit leading back to the source of supply, a sliding element adapted to be moved by hand to close said inlet, thereby to force lubricant in the pipe system to operate said cups, a spring pressed ball cooperating with a shoulder on said sliding part to hold said part in inlet closing position until the pressure on the end of said part is sufficient to overcome the spring pressure against said ball, and adjustable means cooperating with said spring-pressed ball to vary the pressure at which said ball may be released by the lubricant pressure on said sliding part.

6. In a central lubricating system having a plurality of charge-determining cups, and a pump for forcing lubricant from a source of supply through a pipe system to said cups, a combined hand operative and automatic lubricant pressure operative device inserted in the pipe system, said device including means providing a chamber having inlet and outlet passages, the inlet connected to the pipe system and the outlet connected to a conduit leading back to the source of supply, a sliding element adapted to be moved by hand toward said inlet passage and a flexible washer adapted to make a lubricant tight seal with said sliding part to prevent passage of lubricant through said device until the lubricant in said inlet passage reaches a predetermined pressure.

7. In a central lubricating system for motor vehicles, a pump adapted to be operated continuously with the operation of the motor of the vehicle, a lubricant supply reservoir, a pipe system connecting said pump, reservoir and parts to be lubricated, and a by-pass device comprising means normally permitting lubricant to pass therethrough to be returned to the reservoir, said device providing quick-acting means cooperating to direct the lubricant from the pump to the parts to be lubricated until the lubricant in the system reaches a predetermined pressure, this pressure acting upon the by-pass device automatically to permit the lubricant to pass again therethrough to be returned to the supply reservoir.

8. In a central lubricating system, a source of lubricant supply under pressure, a conduit system connecting said source of supply with a plurality of parts requiring lubrication, metering devices in said conduit system requiring a predetermined lubricant pressure for their effective operation, and relief means therein normally permitting by-pass of the lubricant supplied from said source without raising the pressure in said conduit system sufficiently to operate said metering devices comprising a body portion having a bore therein, a member slidable in said bore, an inlet passage, an outlet passage, and sealing means adapted to co-operate with said slidable member when moved in one direction to provide a lubricant-tight seal and prevent passage of lubricant beyond said inlet passage.

9. A central lubricating system of the class described comprising a source of lubricant supply under pressure, a conduit system connecting said source of supply with parts requiring lubrication, metering devices in said conduit system requiring a predetermined pressure for their effective operation, and a by-pass device normally permitting by-pass of all of the lubricant supplied from said source without raising the pressure in the conduit system to said predetermined pressure comprising a body portion having a bore therein, a member slidable in said bore, an inlet passage, an outlet passage, sealing means adapted to co-operate with said slidable member when moved in one direction to provide a lubricant-tight seal and prevent passage of lubricant beyond said inlet passage, an adjustable detent means co-operating with said slidable member to vary the pressure required to move said slidable member in the opposite direction and to thus vary the maximum pressure which may be developed in the lubricating system.

10. A central lubricating system including a lubricant reservoir, a plurality of elements to be lubricated from said reservoir, a pipe system connecting said reservoir with said elements, a pump for forcing the lubricant to said elements and a by-pass device normally by-passing the lubricant at a pressure sufficiently low to prevent its flow to said elements from said pump back to said reservoir but adapted to be operated so that the lubricant will be forced under pressure to said elements to be lubricated.

11. A central lubricating system including a lubricant reservoir, a plurality of charge-determining cups adapted to receive lubricant from said reservoir, means associated with said cups to be operated by lubricant pressure, a pipe system connecting said cups with said reservoir, a pump inserted in said system to pump the lubricant from said reservoir to said cups, a lubricant control device normally by-passing the lubricant from said pump back to said reservoir and means associated with said lubricant control device for cutting off the return of lubricant to said reservoir until the means associated with said cups have been operated and the pressure reaches a pressure sufficient to automatically open said control device and permit the lubricant again to by-pass to the reservoir automatically to place the system in position for further operation.

In testimony whereof, I have signed my name to this specification.

HOWARD J. MURPHY.